March 17, 1953  A. W. FRANCIS  2,631,966
SOLVENT EXTRACTION WITH LIQUID CARBON DIOXIDE
Filed May 8, 1950  9 Sheets-Sheet 1

INVENTOR.
Alfred W. Francis
BY
Robert D. Flynn
AGENT

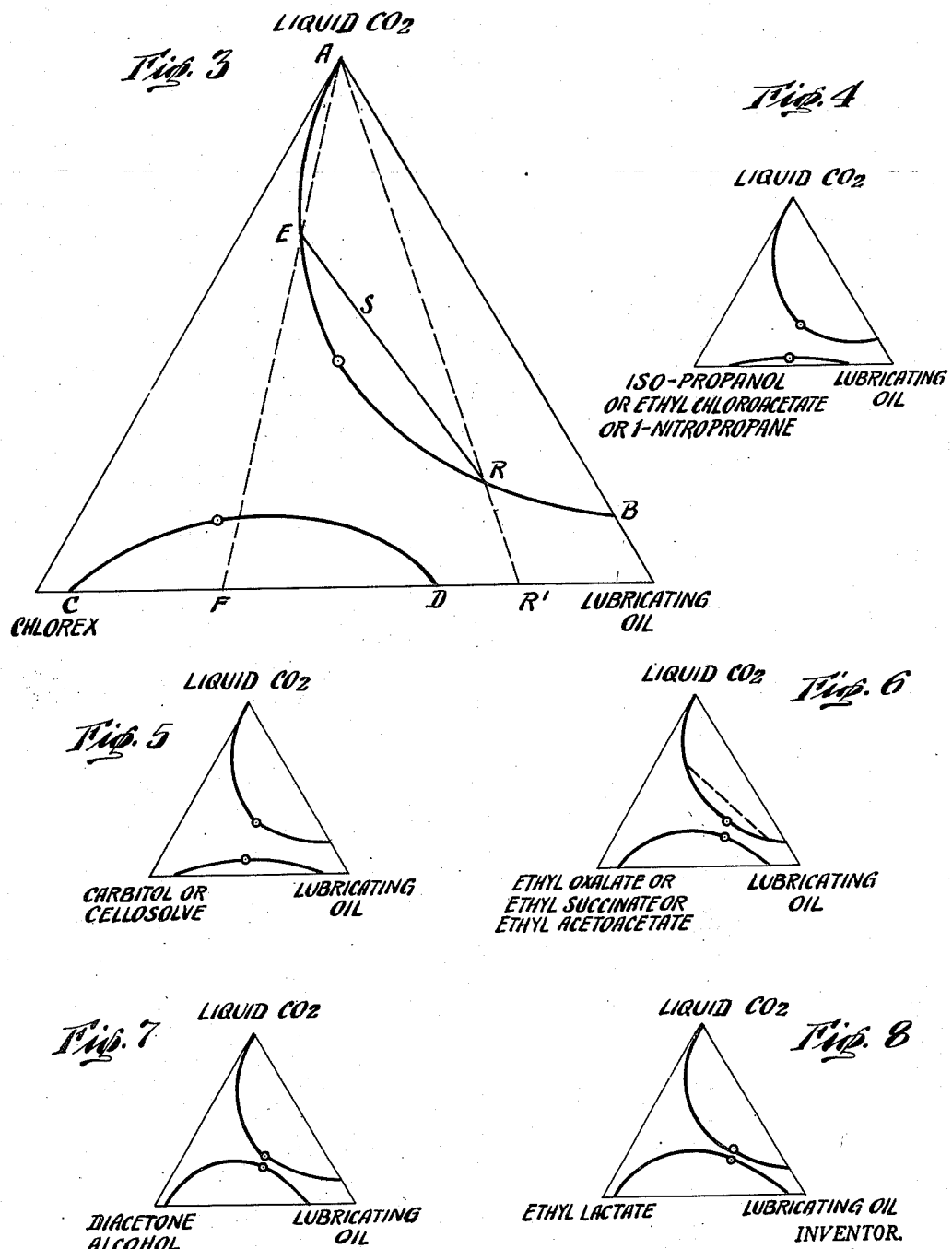

March 17, 1953     A. W. FRANCIS     2,631,966
SOLVENT EXTRACTION WITH LIQUID CARBON DIOXIDE
Filed May 8, 1950     9 Sheets-Sheet 3
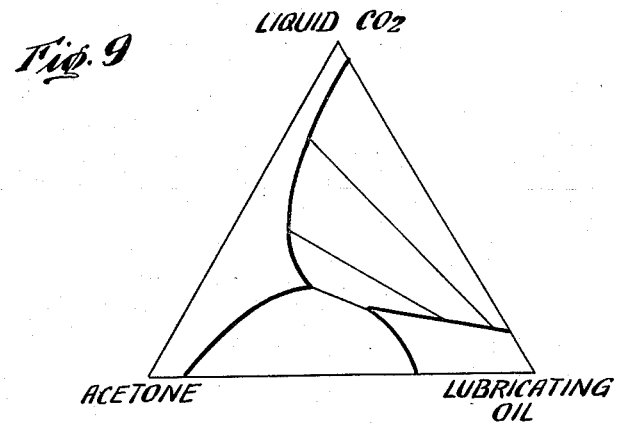
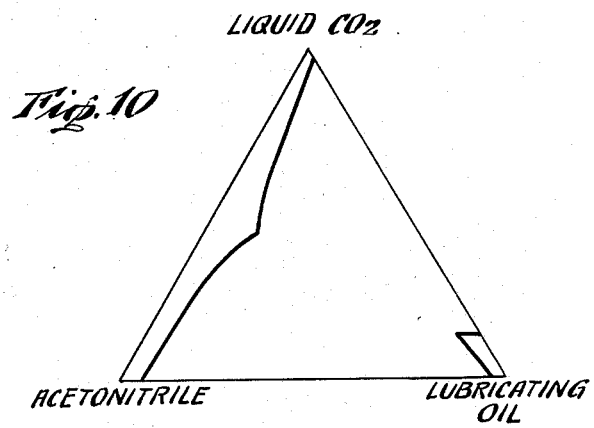
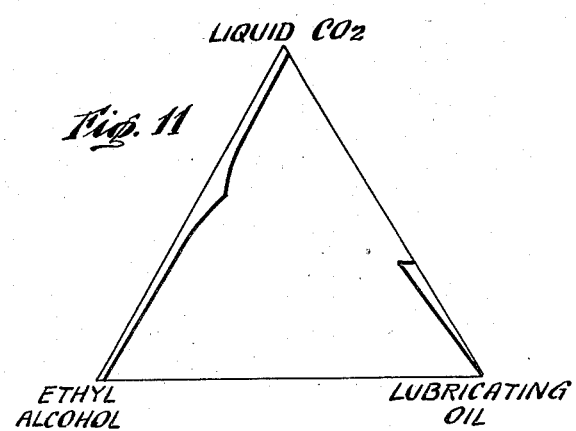
INVENTOR.
Alfred W. Francis
BY
Robert D. Flynn
AGENT March 17, 1953  A. W. FRANCIS  2,631,966
SOLVENT EXTRACTION WITH LIQUID CARBON DIOXIDE
Filed May 8, 1950  9 Sheets-Sheet 4
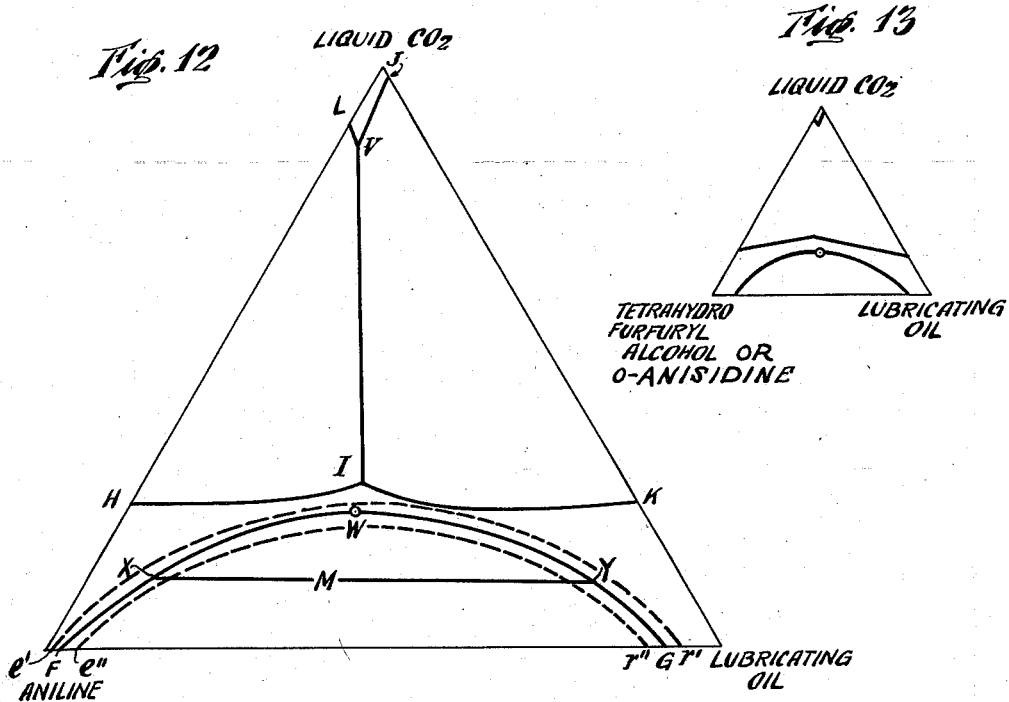
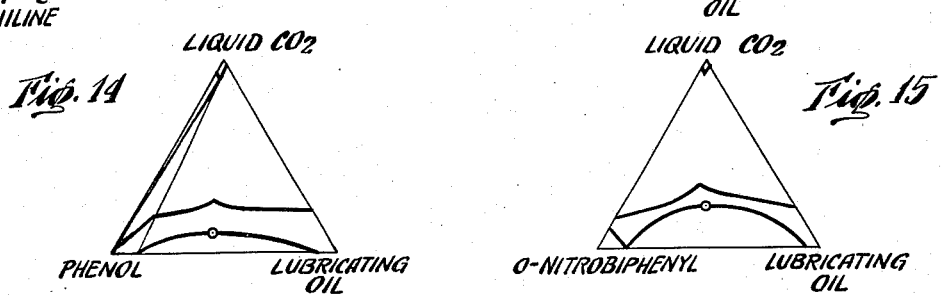
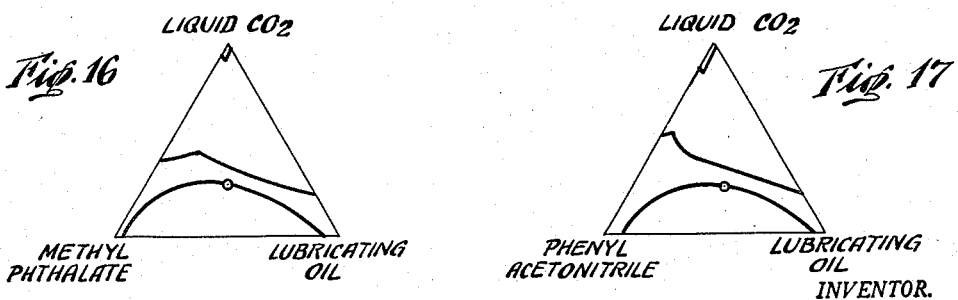
INVENTOR.
Alfred W. Francis
BY
Robert D. Flynn
AGENT March 17, 1953     A. W. FRANCIS     2,631,966
SOLVENT EXTRACTION WITH LIQUID CARBON DIOXIDE
Filed May 8, 1950     9 Sheets-Sheet 5
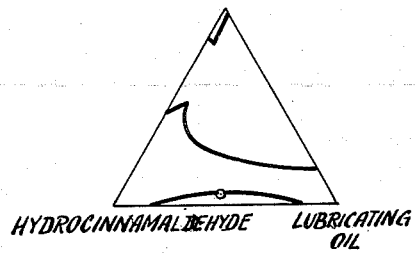
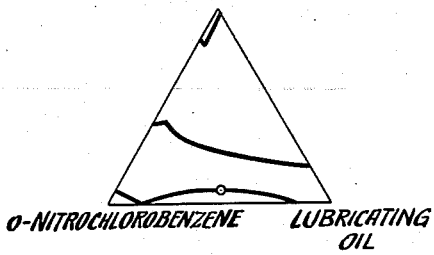
INVENTOR.
Alfred W. Francis
BY
Robert D. Flynn
AGENT March 17, 1953 A. W. FRANCIS 2,631,966
SOLVENT EXTRACTION WITH LIQUID CARBON DIOXIDE
Filed May 8, 1950 9 Sheets-Sheet 6

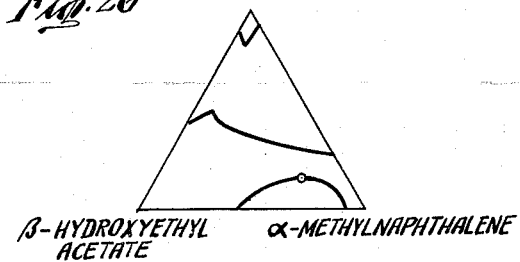

Fig. 26 — LIQUID $CO_2$ / β-HYDROXYETHYL ACETATE / α-METHYLNAPHTHALENE

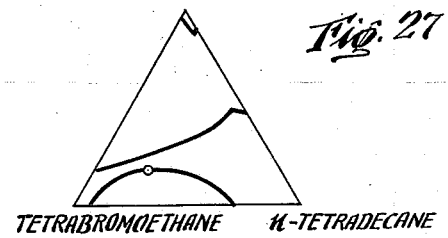

Fig. 27 — LIQUID $CO_2$ / TETRABROMOETHANE / n-TETRADECANE

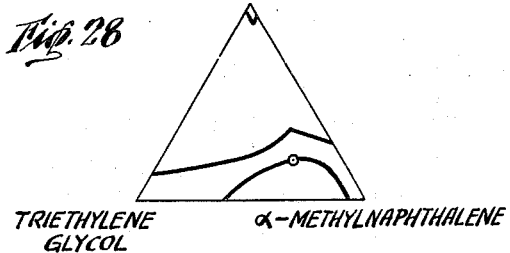

Fig. 28 — LIQUID $CO_2$ / TRIETHYLENE GLYCOL / α-METHYLNAPHTHALENE

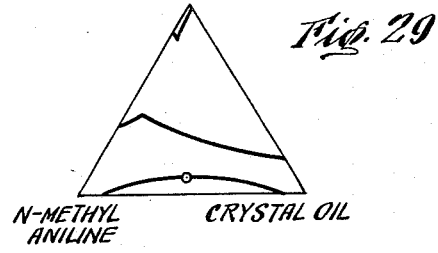

Fig. 29 — LIQUID $CO_2$ / N-METHYL ANILINE / CRYSTAL OIL

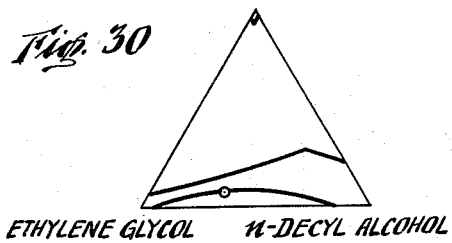

Fig. 30 — LIQUID $CO_2$ / ETHYLENE GLYCOL / n-DECYL ALCOHOL

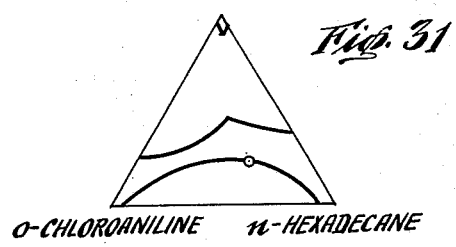

Fig. 31 — LIQUID $CO_2$ / O-CHLOROANILINE / n-HEXADECANE

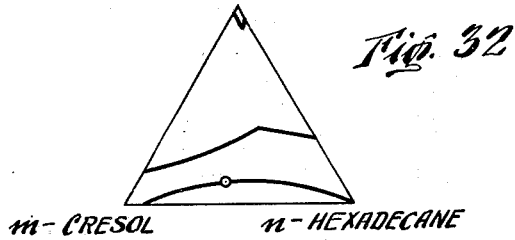

Fig. 32 — LIQUID $CO_2$ / m-CRESOL / n-HEXADECANE

INVENTOR.
Alfred W. Francis
BY
Robert D. Flynn
AGENT

March 17, 1953  A. W. FRANCIS  2,631,966
SOLVENT EXTRACTION WITH LIQUID CARBON DIOXIDE
Filed May 8, 1950  9 Sheets-Sheet 7

LIQUID CO₂

SO₂  KEROSENE

LIQUID CO₂

METHANOL  KEROSENE

LIQUID CO₂

FORMIC ACID  n-TETRADECANE

LIQUID CO₂

CHLOROACETIC ACID  n-HEPTANE

LIQUID CO₂ m-CRESOL  KEROSENE

INVENTOR.
Alfred W. Francis
BY
Robert D. Flynn
AGENT

March 17, 1953 A. W. FRANCIS 2,631,966
SOLVENT EXTRACTION WITH LIQUID CARBON DIOXIDE
Filed May 8, 1950 9 Sheets-Sheet 8

INVENTOR.
Alfred W. Francis
BY
Robert D. Flynn
AGENT

March 17, 1953 — A. W. FRANCIS — 2,631,966
SOLVENT EXTRACTION WITH LIQUID CARBON DIOXIDE
Filed May 8, 1950 — 9 Sheets-Sheet 9

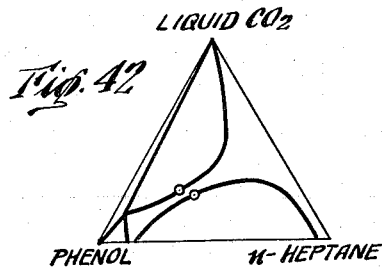

Fig. 42 — LIQUID $CO_2$ / PHENOL / n-HEPTANE

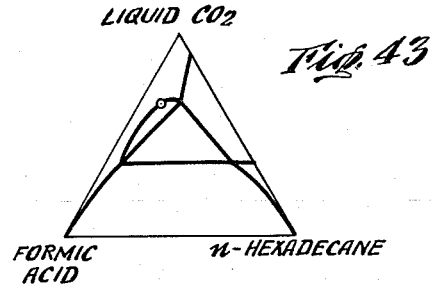

Fig. 43 — LIQUID $CO_2$ / FORMIC ACID / n-HEXADECANE

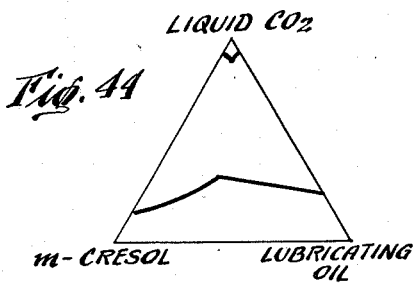

Fig. 44 — LIQUID $CO_2$ / m-CRESOL / LUBRICATING OIL

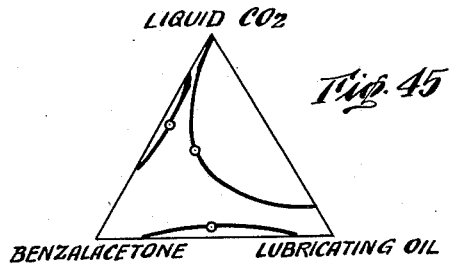

Fig. 45 — LIQUID $CO_2$ / BENZALACETONE / LUBRICATING OIL

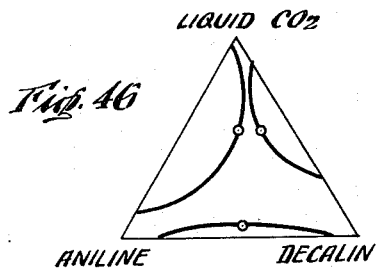

Fig. 46 — LIQUID $CO_2$ / ANILINE / DECALIN

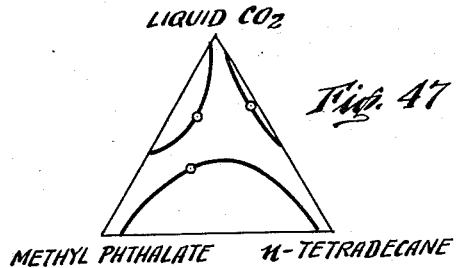

Fig. 47 — LIQUID $CO_2$ / METHYL PHTHALATE / n-TETRADECANE

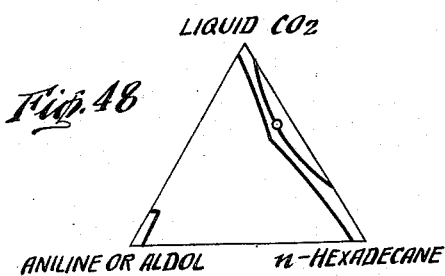

Fig. 48 — LIQUID $CO_2$ / ANILINE OR ALDOL / n-HEXADECANE

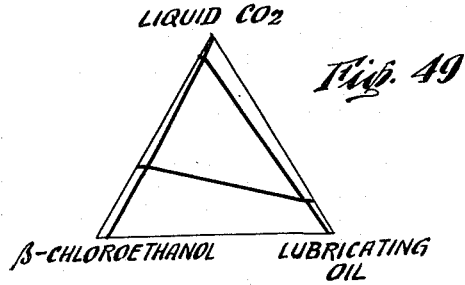

Fig. 49 — LIQUID $CO_2$ / β-CHLOROETHANOL / LUBRICATING OIL

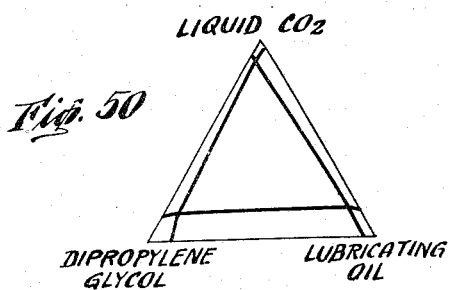

Fig. 50 — LIQUID $CO_2$ / DIPROPYLENE GLYCOL / LUBRICATING OIL

INVENTOR.
Alfred W. Francis
BY Robert D. Flynn
AGENT

Patented Mar. 17, 1953

2,631,966

UNITED STATES PATENT OFFICE 2,631,966

SOLVENT EXTRACTION WITH LIQUID
CARBON DIOXIDE

Alfred W. Francis, Woodbury, N. J., assignor to
Socony-Vacuum Oil Company, Incorporated, a
corporation of New York Application May 8, 1950, Serial No. 160,619

19 Claims. (Cl. 196—14.2)

This invention has to do with extraction with certain selective solvents of various mixtures, and particularly hydrocarbon mixtures such as lubricating oil stocks, to separate the mixtures into fractions having different properties.

Numerous processes have been developed for the separation of hydrocarbons and hydrocarbon derivatives of different molecular configuration by taking advantage of their selective solubility in selected reagents or solvents from which they later can be separated. Exemplary of hydrocarbon separation procedures is the Edeleanu process, wherein paraffinic materials are separated from aromatics by virtue of the greater solubility of aromatics in liquid sulfur dioxide. Lubricating oil solvent refining processes, solvent deasphalting, solvent dewaxing and the like are further examples of the separation of hydrocarbons of different molecular configuration.

Many liquids have been proposed and some of them have been used as selective solvents for effecting separation of different classes of hydrocarbons. They vary greatly in selectivity and in applicability for various boiling ranges of hydrocarbons. For the same boiling range the solubility increases in the order, paraffins, naphthenes, olefins, alkyl benzenes and polycyclic aromatics for practically all available solvents. For many extractions this is a convenient order, since small quantities of polycyclics which are detrimental to the viscosity index of a lubricant, can be removed by suitable solvents. In other cases, a reverse order of selectivity would be more convenient. Solvents having the latter selectivity are probably so characterized only when used in the vicinity of their critical temperatures. For example propane—critical temperature, 95.6° C.— has been used at 80–100° C. for solvent refining of vegetable oils, but for mineral oils it has a very limited applicability, because only a few polycyclics separate at all and the selectivity is slight. Ethane—critical temperature, 32.3° C.—is no better in this respect.

Liquid carbon dioxide, however, has unusual miscibility relations with hydrocarbons and other substances, for it dissolves aliphatic and monocyclic aromatic hydrocarbons in preference to polycyclics of the same boiling range. The selectivity is many times greater than that manifested by propane and ethane. The miscibility relationship, then, is the reverse of that with almost all other solvents in which the more highly cyclicized hydrocarbons are more soluble. While liquid carbon dioxide is advantageous in view of this unusual miscibility characteristic, and is also favored by low cost, non-corrosiveness, non-toxicity, and ease of recovery from extract and raffinate phases, its use is limited by its complete miscibility with most gasoline hydrocarbons, and on the other hand by its slight solubility for lubricating oils. For example, it has been shown that the maximum solubility for a typical lubricating oil in liquid carbon dioxide is only 0.9 per cent at 10° C.; and at 25° C., the solubility is only 0.72 per cent. To one skilled in the art, it is obvious that these solubilities are too low for practical purposes.

Carbon dioxide has a critical temperature of 31.1° C. (88° F.).

This invention is predicated upon the discovery of an advantageous and practical solvent extraction procedure in which liquid carbon dioxide is used in combination with certain solvents with which it cooperates.

PRIOR ART

One of the first to extract oils with liquid carbon dioxide was Auerbach. As shown by Auerbach in U. S. Letters Patent 1,805,751 and related foreign patents (Canadian 285,782, and British 277,946 and 285,064), certain light lubricating oil fractions are soluble in liquid carbon dioxide to the extent of only about three per cent. Schilling and Stadler (2,029,120) also described a selective separation with liquid carbon dioxide, showing the removal of unsaturated hydrocarbons from gas mixtures.

Several investigators have also described a selective separation of hydrocarbons in which liquid carbon dioxide is used in combination with liquid $SO_2$ (2,034,495; 2,346,639; German 546,123). Refining of petroleum fractions to effect removal of sulfur compounds, using $SO_3$ in combination with liquid carbon dioxide is disclosed by Gary (1,893,138).

Low molecular weight paraffins, such as propane, have also been used with liquid carbon dioxide in extracting hydrocarbon mixtures. This is shown by Lantz (2,188,051).

Liquid carbon dioxide has also been described as a selective extractant by Webb (2,246,227). Typical of the diluents shown by the latter for use with liquid carbon dioxide are: hydrocarbons such as propane; solvents such as acetone, pyridine, liquid $SO_2$, cresylic acid and other solvents of the type of preferential solvents for non-paraffinic hydrocarbons. A similar disclosure is found in 2,281,865 (van Dijck); used with liquid carbon dioxide are hydrocarbons and solvents known as selective or naphthenic (or aromatic) solvents such as furfural, nitrobenzene, Chlorex, cresylic acid, phenol, aniline and quinoline. The solvents used by van Dijck are necessarily employed in relatively small quantities, actually only those quantities which are miscible with an oil. In the cases of furfural, aniline and phenol, the quantities used are minute—of the order of one or two per cent. Pilat and Godlewicz (2,315,-131) have modified the processes described by Lantz, Webb, and van Dijck, by using gaseous carbon dioxide with another solvent such as a hydrocarbon or a selective or naphthenic solvent.

OUTLINE OF INVENTION

It has now been discovered that a plurality of fractions of different properties are obtained by contacting a mixture of compounds, particularly lubricating oil stocks, with liquid carbon dioxide and a solvent A which is miscible with liquid carbon dioxide, incompletely miscible with the mixture of compounds, and does not form a solid salt with carbon dioxide at temperatures of 20° C. and higher. The sequence of operations used in effecting separation of the several fractions includes:

(a) contacting lubricating oil stock with liquid carbon dioxide and solvent A under pressure, whereupon a raffinate phase and an extract phase are formed;
(b) separating the raffinate and extract phases under pressure;
(c) removing carbon dioxide from the extract phase, whereupon two additional phases are formed, a second raffinate phase and a second extract phase; and
(d) separating the second raffinate and extract phases.

A related and advantageous extraction providing a plurality of fractions, involves contacting a mixture of compounds with liquid carbon dioxide and a solvent B which is incompletely miscible with liquid carbon dioxide and with the mixture of compounds, does not form a solid salt with carbon dioxide at temperatures of 20° C. and higher and does not form three phases with the mixture and liquid carbon dioxide. The sequence followed with this extraction comprises:

(a) contacting lubricating oil stock with liquid carbon dioxide and solvent B under pressure, whereupon a raffinate phase and an extract phase are formed;
(b) separating the raffinate and extract phases under pressure;
(c) removing carbon dioxide from the raffinate phase, whereupon two additional phases are formed, a raffinate-raffinate phase and a raffinate-extract phase;
(d) separating the raffinate-raffinate phase and the raffinate-extract phases;
(e) removing carbon dioxide from the extract phase, whereupon two new phases are formed, an extract-raffinate phase and an extract-extract phase;
(f) separating the extract-raffinate phase and the extract-extract phase.

Wherever a compound word, such as extract-raffinate, is used herein, the above meaning is retained. Thus, an extract-raffinate is the fraction resulting from a double extraction of oil (or other mixture), the fraction being in the oil-lean phase of the first extraction and in the oil-rich phase of the second extraction.

OBJECTS

It is an object of this invention, therefore, to provide an effective means for separating a multiplicity of fractions or compounds of different properties from mixtures containing the same.

It is also an object of this invention to provide for the selective separation of several hydrocarbon fractions of different properties from hydrocarbon mixtures. An important object is the selective separation of several hydrocarbon fractions, differing in properties, from high molecular weight hydrocarbon mixtures, and particularly from lubricating oil stocks. A further object is to selectively separate polycyclic aromatic hydrocarbons from mixtures containing the same. Still another object is to selectively separate alkyl benzenes from mixtures containing the same.

Other objects and advantages of the invention will be apparent from the following description.

INVENTION IN DETAIL

As indicated above, liquid carbon dioxide and a second solvent, described more fully hereinbelow, are used together in the selective separation process of this invention.

Liquid carbon dioxide miscibilities are related to structure. Among hydrocarbons, the lower non-aromatics up to about $C_{12}$ and mono-cyclics up to $C_{18}$ are miscible therewith; but polycyclics with rings either fused or not, and saturated or not, have limited miscibility. More specifically, liquid carbon dioxide has been found to be completely miscible at 25° C. with paraffins up to $C_{12}$, olefins up to $C_{16}$, alkylbenzenes up to $C_{18}$ and with the naphthalenes, cyclohexane and methylcyclohexane, but only moderately soluble with n-tetradecane, n-hexadecane, n-octadecane, 1-octadecene, and bicyclics such as naphthalene, tetralin, decalin and alpha- and beta- methylnaphthalenes, dimethylnaphthalenes, biphenyl, bibenzyl, diphenylmethane and phenylcyclohexane. Its solubility for lubricating oil is slight, as indicated above. These solubility relationships can be modified to only a small degree by temperature changes.

Similar solubility relationships obtain with hydrocarbon derivatives. For example, substituents such as methyl, halogen, ether oxygen and carbonyl groups, on a hydrocarbon, have little effect upon miscibility. Hydroxyl, nitro, amino and sulfonic acid groups are much more pronounced in diminishing solubility.

As indicated above in III, solvents used with liquid carbon dioxide and designated by the symbol A are miscible with liquid carbon dioxide and incompletely miscible with the mixture to be extracted. In addition, solvents in this group do not form solid salts with carbon dioxide at temperatures of 20° and greater. Preferably, too, if the solvents are not normally liquid, they should become so in contact with liquid carbon dioxide. This generally occurs if their melting points are less than about 60° C. Included among this class of solvents A are the following: Chlorex ($\beta,\beta'$-dichlorodiethyl ether), isopropanol, Cellosolve ($\beta$-ethoxy ethanol), Carbitol (diethylene glycol monoethyl ether), 1-nitropropane, diacetone alcohol, ethyl lactate, ethyl chloroacetate, ethyl succinate, ethyl oxalate, ethyl acetoacetate, and benzonitrile. At about 20–25° C., the last is satisfactory with heavy or viscous lubricating oil stocks; in contrast, it is miscible with the lighter stocks. Benzonitrile is satisfactory with the lighter oil stocks at lower temperatures, at which the solvent and oil no longer mix. Of these solvents, Chlorex and Cellosolve have been found to be particularly effective in cooperating with liquid carbon dioxide.

Additional solvents of type A contemplated herein, although appreciably less satisfactory for multiple extraction than those already recited, such as Chlorex, include: acetone; ethyl maleate; $\beta$-chloroethyl acetate; furfural; triacetin; acetonitrile; dimethyl formamide; $\beta$-methoxyethanol (methyl Cellosolve); methyl formate; chloroacetone; ethyl sulfate; nitroethane; sulfur dioxide; ethanol; methanol; acetic acid; acetic anhydride; acetonylacetone; ethylene diformate; methyl sulfate; acetaldehyde; and nitromethane.

Solvents designated above the symbol B are incompletely miscible with liquid carbon dioxide and with the mixture to be treated. Additionally, these solvents B do not form solid salts with carbon dioxide at temperatures of 20° C. and higher. Still another characterizing feature of this family of solvents is their failure to form three individual phases with liquid carbon dioxide and the mixture to be resolved. Again, for ease of operation, the solvents B should have melting points not greater than about 60° C. Representative solvents B having such properties include: aniline, o-chloroaniline, m-chloroaniline, cresols (o, and p), o-toluidine, tetrahydrofurfuryl alcohol, phenylethanol, pinacol, phenol phenylacetonitrile, hydrocinnamaldehyde, methyl phthalate, o-nitrochlorobenzene, beta-hydroxyethyl acetate, o-nitrobiphenyl, o-anisidine, benzoic anhydride, cinnamaldehyde, triethylene glycol, benzyl alcohol, and ethyl phthalate. Of these solvents, tetrahydrofurfuryl alcohol has proven particularly advantageous. Aniline has also been highly effective when used in the treatment of a naphthenic type oil stock.

Triethylene glycol and $\beta$-hydroxyethyl acetate (included in group B) form three layers with liquid carbon dioxide and certain mixtures, such as lubricating oils. Yet, they do not form three layers when used with liquid carbon dioxide and methyl naphthalenes.

The hydrocarbon miscibilities of solvents A and B, together with carbon dioxide solubilities for solvents of type B, are shown in Table I, below.

Table I

| Solvent | Hydrocarbon Miscibility [1] | Solubility, Wt. Percent [2] | |
|---|---|---|---|
| | | for $CO_2$ | in $CO_2$ |
| A | | | |
| Cellosolve | a | | |
| Ethyl chloroacetate | a | | |
| Isopropyl alcohol | a | | |
| 1-Nitropropane | a | | |
| Carbitol | a | | |
| Benzonitrile | a | | |
| Chlorex | a | | |
| Diacetone alcohol | a | | |
| Ethyl lactate | a | | |
| Ethyl oxalate | a | | |
| Ethyl acetoacetate | b | | |
| Ethyl succinate | b | | |
| B | | | |
| o-Cresol (M. Pt. 30° C.) | a | 30 | 2 |
| p-Cresol (M. Pt. 36° C.) | a | 30 | 2 |
| N-methyl aniline | a | 40 | 20 |
| o-Toluidine | a | 37 | 7 |
| o-Chloroaniline | a | 25 | 5 |
| Hydrocinnamaldehyde | a | 55 | 17 |
| Benzyl alcohol | b | 27 | 8 |
| Ethyl phthalate | b | 60 | 10 |
| o-Nitrochlorobenzene (M. Pt. 32° C.) | b | 42 | 21 |
| Phenol (M. Pt. 41° C.) | b | 15 | 3 |
| Phenylethanol | b | 15 | 3 |
| Aniline | c | 20 | 3 |
| o-Anisidine | c | 20 | 1 |
| Benzoic anhydride (M. Pt. 42° C.) | c | 20 | 3 |
| Cinnamaldehyde | c | 20 | 4 |
| Methyl phthalate | c | 43 | 6 |
| o-Nitrobiphenyl (M. Pt. 37° C.) | c | 15 | 2 |
| Phenylacetonitrile | c | 52 | 13 |
| Pinacol (M. Pt. 38° C.) | c | 23 | 2 |
| Tetrahydrofurfuryl alcohol | c | 20 | 3 |
| m-Chloroaniline | c | 23 | 1 |
| $\beta$-Hydroxyethyl acetate | d | 50 | 17 |
| Triethylene glycol | d | 12 | 6 |
| Ethylene glycol | e | 7 | 0.2 |

[1] Hydrocarbon miscibilities at 25° C. as liquid. A solid is considered miscible with a hydrocarbon or carbon dioxide if it is highly soluble in it (e. g., over 40%) without the formation of liquid layers in equilibrium. If a substance is miscible with one group of hydrocarbons, as indicated by a footnote letter, it is also miscible with all of the hydrocarbons indicated by letters following this one in the series. Thus, "a" means "a, b, c, d," "b" actually means "b, c, d"; "c" means "c, d."
[2] Solubilities of 2% or less are approximations (±1%), in view of the difficulty in determining the same.
  a—Miscible with n-heptane.
  b—Miscible with methylcyclohexane and lower naphthenes.
  c—Miscible with di-(sec-butyl) benzene and lower aromatics.
  d—Miscible with benzene.
  e—Not miscible with any hydrocarbon.

The foregoing solvents and liquid carbon dioxide are effective in resolving various mixtures into a multiplicity of fractions, or compounds, of different properties. They are particularly advantageous in the resolution of lubricating oil stocks, representative of which are Pennsylvania, Mid-Continent and Coastal types, or paraffinic, naphthenic and aromatic types. Other hydrocarbon mixtures successfully treated include gas oils, fuel oils, shale oils, transformer oils, cable oils, coal tar fractions, etc. Still other mixtures which can be treated with appropriate solvents of groups A and B, include: mixtures of alcohols, such as those obtained by hydrogenation of oxides of carbon; mixtures of vegetable oils; mixtures of aromatic amines; etc.

In order that this invention may be more readily understood, typical separations are described below with reference being made to the drawings attached hereto.

In Figure I, a charge such as a highly naphthenic lubricating oil stock, for example, one having a density of 0.910, a refractive index ($n_D^{20}$) of 1.5076 and a critical solution temperature (aniline) of 72° C., in tank 1 is introduced through line 2 to extractor 3. Chlorex in tank 4, is introduced through line 5 into an upper section of 3, and liquid carbon dioxide in tank 6 is introduced through line 7 to a lower section of 3 wherein each solvent flows countercurrent to portions of the oil charge. It will be understood that the extractor 3 can comprise conventional countercurrent stage or tower extraction equipment. Contact of Chlorex, liquid carbon dioxide and oil can also be aided by conventional packing material in extractor 3.

The temperature of the oil and solvents in extractor 3 should be not much greater than about 31.1° C., the critical temperature of carbon dioxide. Slightly higher temperatures, up to about 36° C., can be used in some cases because enough solvent (A or B) and/or hydrocarbon may dissolve in the carbon dioxide-rich phase to make it liquid above the critical temperature of pure carbon dioxide. This temperature condition can be realized by maintaining both the oil and solvents at the required temperature prior to introduction to the extractor 3, or the latter can be maintained at the required temperature by well known cooling or heat exchange means. The pressure in extractor 3 is maintained sufficiently high so as to maintain a phase rich in carbon dioxide in the liquid state.

The ratio of solvent, Chlorex to oil in the extractor 3 is preferably maintained within the range of 1:1 to 2:1, and that of liquid carbon dioxide to oil within the range of 1:1 to 5:1. This feature is explained in more detail hereinafter with reference to a phase diagram for the system liquid carbon dioxide-Chlorex-lubricating oil.

In the extractor 3, a raffinate phase and an extract phase are formed. The raffinate phase (the heavier phase) contains a relatively large proportion of the polycyclic hydrocarbons present in the oil charge and some paraffins and naphthenes. Also present in the raffinate phase is Chlorex and carbon dioxide. The raffinate phase is withdrawn from extractor 3 through line 8 to solvent recovery vessel 9. The raffinate is fractionated in 9, with the Chlorex and carbon dioxide being taken overhead through line 10 and recycled through line 5. This fractionation can be accomplished by using high temperature, or it can be accomplished by countercurrent extraction with liquid carbon dioxide as described in copending application Serial No. 162,587, filed May 8, 1950. A raffinate oil fraction is removed from 9 through 11; this fraction is suitable for use, for example, as an insecticidal oil.

The extract phase in extractor 3 is removed through line 12 to vessel 13, which is equipped with suitable means for effecting release of carbon dioxide from the extract phase. For example, a heat exchange medium can be circulated through the wall of vessel 13 or through coils therein, to raise the temperature of the extract phase. Also, pressure reducing means can be provided. In vessel 13, then, carbon dioxide is removed through line 14 and recycled to reservoir 6. In line 14, a condenser (not shown) is used when carbon dioxide is removed by applying heat to vessel 13; or a compressor (not shown) is positioned in line 14 when carbon dioxide is removed by pressure reduction. The extract phase, substantially free of carbon dioxide, is taken through line 15 to settler 16. When the extract phase is allowed to stand in settler 16, a further separation takes place, with the formation of an extract-extract phase and an extract-raffinate phase. Thus, a "double extraction" is effected upon removal of the carbon dioxide. The extract-raffinate contains the high quality lubricating components of the charge and some Chlorex. This is taken through line 17 and fractionated in solvent recovery vessel 18. Again, the fractionation can be accomplished by distillation or by countercurrent extraction with liquid carbon dioxide. Chlorex and residual carbon dioxide (if used) are taken overhead through line 19 and recycled to line 10 and reservoir 4. The high quality oil is removed from 18 as a bottom product through line 20. The oil removed through line 20 has a substantially higher viscosity index than the original charge and other fractions thereof.

The extract-extract separated in settler 16 is taken through line 21 and distilled in still 22. Chlorex and any residual carbon dioxide present in the extract-extract are removed overhead through line 23 and recycled through line 10. An extract-extract oil fraction, substantially free of Chlorex and carbon dioxide, is removed from still 22 through line 24. It will be understood that the extract-extract fraction (line 21) and/or the first raffinate (line 8) can be recycled to the extractor 3 if desired, and if so, the Chlorex and carbon dioxide present therein need not be removed before the recycling operation.

A representative procedure in which a solvent of type B, above, is used is shown by Figure 2. In this procedure, tetrahydrofurfuryl alcohol is the solvent cooperating with liquid carbon dioxide to provide a multiplicity of fractions having different properties. A charge such as the lubricating oil stock described in connection with Figure 1, above, is taken from reservoir 30, through line 31, to extractor 32. Tetrahydrofurfuryl alcohol in tank 33 is taken through line 34 into an upper section of 32, and liquid carbon dioxide in tank 35 is taken through line 36 and introduced into a lower section of extractor 32. The materials in extractor 32 are maintained under pressure and at a suitable temperature as discussed earlier in connection with extractor 3. Here too, a raffinate phase and an extract phase are formed. The raffinate phase (the heavier phase) contains a preponderance of the polycyclic hydrocarbons present in the oil charge, in association with some tetrahydrofurfuryl alcohol and carbon dioxide. The raffinate phase, still under pressure, is brought from extractor 32 through line 37 to carbon dioxide recovery vessel 38. The latter is equipped with suitable pressure reducing and/or temperature increasing means in order that carbon dioxide can be separated. Upon removal of carbon dioxide through line 39, the raffinate is taken through line 40 to settler 41. The raffinate in settler 41, separates upon standing, thus providing a raffinate-raffinate phase (upper layer) and a raffinate-extract phase. The raffinate-raffinate comprises an oil of intermediate quality and some tetrahydrofurfuryl alcohol. The raffinate-raffinate can be taken through line 42 and recycled to reservoir 30, as shown; or it can be distilled (not shown), if desired. The tetrahydrofurfuryl alcohol and oil recovered upon distillation can be recycled separately. The raffinate-extract phase separated in settler 41 is removed from the system via line 43. The latter phase comprises a low quality oil fraction, rich in polycyclic components of the oil charge, and tetrahydrofurfuryl alcohol. It will be understood that this phase can be distilled to recover the tetrahydrofurfuryl alcohol, and the latter can be recycled to reservoir 33, although the recycling is not shown in Figure 2. Also, while the oil fraction recovered through line 43 is a relatively poor lubricant, it has value, for example, as an insecticidal solvent oil for "DDT" (2,2-dichlorodiphenyltrichloroethane).

The extract phase which separates in extractor 32, is removed through line 44 to carbon dioxide recovery vessel 45. The latter is of the same character as vessel 38, such that carbon dioxide is removed overhead through line 46 and recycled to line 39. Upon removal of carbon dioxide from the extract phase, the latter is taken through line 47 to settler 48. Here too, a further separation occurs; with carbon dioxide removed, an extract-raffinate phase and an extract-extract phase are formed. The extract-raffinate phase (upper layer) contains high quality oil and some tetrahydrofurfuryl alcohol and residual carbon dioxide, and is taken through line 49 to solvent recovery vessel 50. Tetrahydrofurfuryl alcohol and residual carbon dioxide are fractionated overhead from 50 and are recycled through line 51; high quality lubricating oil is removed as a bottoms product through line 52.

The extract-extract phase in settler 48 is removed through line 53 and recycled to line 42 and reservoir 30. Inasmuch as this phase contains some tetrahydrofurfuryl alcohol and residual carbon dioxide, the phase can be distilled (not shown) and the individual products—oil, tetrahydrofurfuryl alcohol and carbon dioxide—can be recycled separately, if desired.

It will be recognized that the foregoing illustrations provided by Figures 1 and 2 are diagrammatic, and that pumps, heaters, coolers, heat exchangers, pressure vessels of various character can be employed.

As indicated above, carbon dioxide is used in liquid form, thus requiring the use of relatively low temperature and high pressures. In effect, the operating temperatures will be not more than slightly above the critical temperature of carbon dioxide, namely, 31.1° C., and preferably below it. While the temperature can be lowered considerably below 31.1° C. satisfactory operation has been realized with temperatures within the range of 10° C. to 35° C. Operating pressures are relatively high, generally about 1000 pounds per square inch (or 70 atmospheres). Usually, pressures are of the order of 600 to 1200 pounds per square inch, depending upon the temperatures employed. Higher pressures make it possible to increase the solubility of various materials in liquid carbon dioxide. For example, with a pressure of 1000 pounds per square inch (p. s. i.) and a temperature of 24° C., the solubility of n-octadecane in liquid carbon dioxide was found to be about three per cent; whereas, with a pressure of 4000 pounds per square inch and a temperature of 24° C., the solubility was eleven per cent. This phenomenon of increased solubility due to contracting on mixing is advantageous, particularly inasmuch as the solubility of lubricating oils in carbon dioxide is undesirably low at the vapor pressure of carbon dioxide. The increase from 3% to 11%, mentioned above, is unusual since the density of the solution is increased enough to make the undissolved oil float upon the solution. The pressure at which the inversion occurs varies with the density of the oil, being high for oils of high density and vice versa. With a decrease of pressure, as by opening a pressure reducing valve, a small amount of oil is released, whereupon the layers are inverted again. This increases the volume of undissolved oil. In this way, liquid pressure can be used to control the solubility of the oil.

The invention is further illustrated by experimental data obtained with liquid carbon dioxide and solvents of types A and B. These experimental data are presented in the form of charts, or more particularly ternary diagrams, identified here as Figures 3 to 50. These diagrams can be used to determine: the suitability of a solvent for a desired separation; the approximate selectivity of the solvents; the range of compositions of liquid carbon dioxide, solvent A or B, and the mixture to be treated; the approximate number of stages or extractions necessary to effect a separation of desired degree; etc.

Figure 3 represents the system liquid carbon dioxide, Chlorex ($\beta,\beta'$-dichlorodiethyl ether) and lubricating oil. It is to be understood that in Figure 3 and in all of the ternary diagrams involving lubricating oil, the phase boundaries are necessarily approximate since the oil is not a pure substance. In fact, the purpose of the fractionations is to separate it into fractions of different properties, which include miscibilities with the solvents. Therefore, with countercurrent operation in extractor 3 of Figure 1, for example, the effective diagram of Figure 3 is appreciably different at the bottom and at the top of the extractor. At the top of the extractor, curve CD of Figure 3 is higher and broader, and curve AERB is shallower. At the bottom of extractor 3, the reverse change appears.

The oil is a highly naphthenic distillate stock having the following properties:

| | |
|---|---|
| A. P. I. gravity | 23.80 |
| Density | 0.910 |
| Refractive index, $n_D^{20}$ | 1.5076 |
| Critical solution temperature (with aniline), °C | 72 |
| Pour point, °F | 20 |
| Flash (open cup), °F | 395 |
| Fire, °F | 455 |
| Viscosity, centistokes at 100° F | 28.65 |
| Viscosity, centistokes at 210° F | 4.51 |
| Viscosity index | 60 |
| Viscosity gravity constant | 0.871 |
| Color, Lovibond | 18 |

Figure 3 reveals that Chlorex and liquid carbon dioxide are completely miscible, and that Chlorex and the oil are incompletely miscible. Mixtures falling within the area defined by curve AERB separate into two layers. One of the layers which separates contains a larger amount of oil in proportion to carbon dioxide, and the other a larger amount of carbon dioxide in proportion to oil. The proportion of these two phases, as well as the concentration thereof, can be determined by the tie lines extending between the sides of the binodal curve across the area of immiscibility. For example, a mixture of 20 per cent Chlorex, 60 per cent carbon dioxide and 20 per cent oil, represented by point S, comes within the area of immiscibility and separates into two phases. The composition of the two phases is determined by the extremities of a tie line E—R passing through the point S. The composition of the extract phase, E, is about 21 per cent Chlorex, about 70 per cent carbon dioxide and about 9 per cent oil. The raffinate phase, R, contains about 17 per cent Chlorex, about 30 per cent carbon dioxide and about 53 per cent oil. The proportion of extract layer to raffinate layer by weight is determined by the ratio of line SR to line SE, and the actual quantities of each can be calculated from the known charges and compositions of the extract and raffinate layers.

Figure 3 also shows that as carbon dioxide is removed from the extract phase, E, following line AEF, two additional layers are formed. Thus, mixtures coming within the area defined by curve C—D separate into two layers, namely an extract-extract phase, C, and an extract-raffinate phase, D. The extract-extract phase, C, contains about 92 per cent Chlorex and about 8 per cent oil; the extract-raffinate phase, D, contains about 42 per cent Chlorex and about 58 per cent oil. The oil in the extract-raffinate phase, isolated by removing the Chlorex, is of excellent quality. In contrast, the oil present in the extract-extract phase is of intermediate quality and can be recycled with the Chlorex associated therewith or following isolation from the Chlorex.

When carbon dioxide is removed from the raffinate phase, R, a Chlorex-oil raffinate is obtained. The latter contains about 24 per cent Chlorex and about 76 per cent oil. This oil fraction is of low quality as a lubricant, having less lubricant value than the oil charge.

Properties of the oil products, after removal of both solvents, are as follows:

| | Refractive Index, $n_D^{20}$ | Aniline Point, °C. |
|---|---|---|
| Oil Charge | 1.5076 | 72 |
| Raffinate (from R') | 1.5228 | 35 |
| Extract-extract (from C) | 1.5025 | 73 |
| Extract-raffinate (from D) | 1.4790 | 89 |

Figures 4 through 8, inclusive, are ternary diagrams of lubricating oil stocks and liquid carbon dioxide with other solvents of type A used in place of Chlorex.

Figure 4 shows the ternary systems of liquid carbon dioxide and lubricating oil with the individual solvents: isopropanol, ethylchloroacetate and 1-nitropropane.

Figure 5 represents the systems: liquid carbon dioxide-Carbitol-lubricating oil, and liquid carbon dioxide-Cellosolve-lubricating oil.

Figure 1:
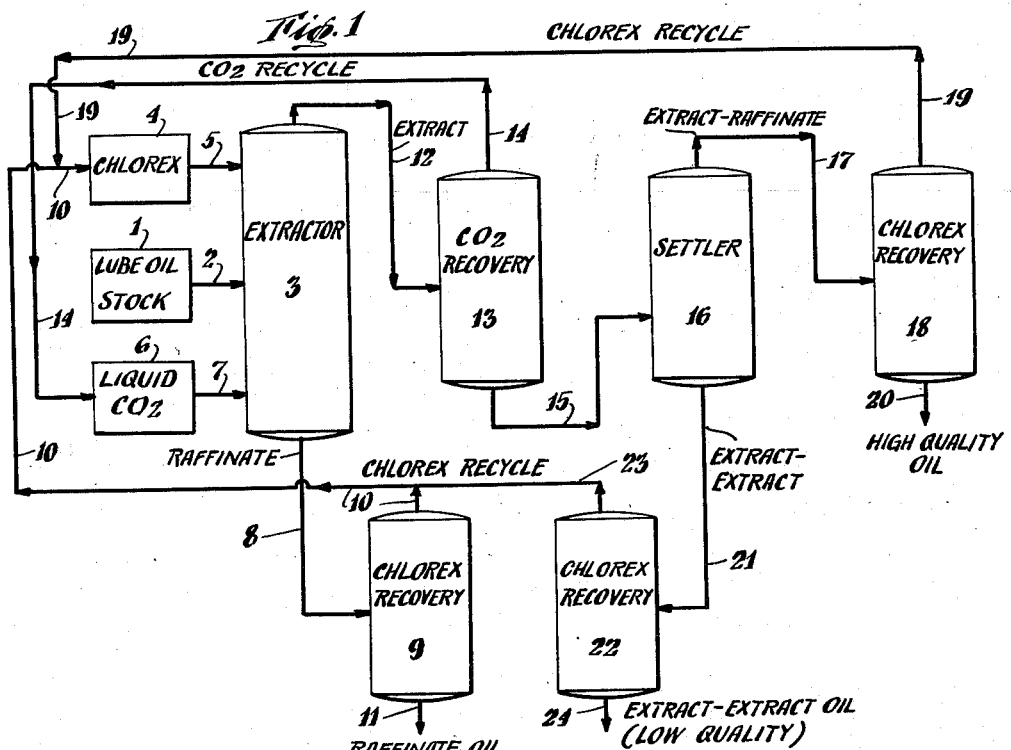
Figure 2:
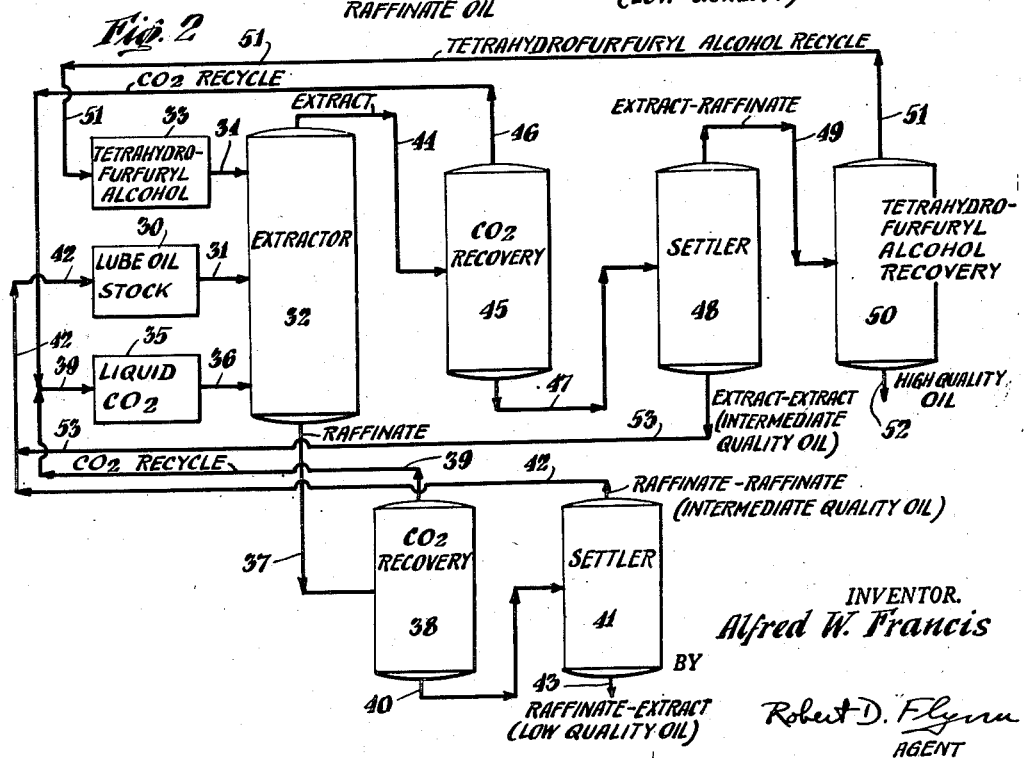

Figure 6: liquid carbon dioxide-ethyl oxalate-lubricating oil, liquid carbon dioxide-ethyl succinate-lubricating oil, and liquid carbon dioxide-ethyl acetoacetate-lubricating oil.

Figure 7: liquid carbon dioxide-diacetone alcohol-lubricating oil.

Figure 8: liquid carbon dioxide-ethyl lactate-lubricating oil.

In Figures 4 through 8, for the lower curve, the oil-rich phase is the lighter and therefore upper layer, except with isopropanol (Fig. 4). For the upper curve, the oil-rich phase is the heavier, except in Fig. 6, below the dotted line, which is an isopycnic. The latter is a tie line connecting compositions of phases of equal density. Between this line and the curve, the oil-rich phase is the lighter one.

When benzonitrile is used with a heavy oil stock and liquid carbon dioxide, the ternary diagram which represents the system is quite similar to Figure 3, above.

In contrast to Figures 3 through 8, systems are shown in Figures 9, 10 and 11 in which the two curves are merged. In these, as in Figures 3-8, liquid carbon dioxide is miscible with the solvent, but neither is miscible with the hydrocarbon component. Figure 9 shows liquid carbon dioxide-acetone-lubricating oil; Figure 10: liquid carbon dioxide-acetonitrile-lubricating oil; and Figure 11: liquid carbon dioxide-ethyl alcohol-lubricating oil. Thirty-five other such systems have been studied.

Figure 12 shows the ternary system, liquid carbon dioxide-aniline-lubricating oil. The oil used is the same as in Figure 3. As revealed by Figure 12, aniline is incompletely miscible with the oil and also incompletely miscible with liquid carbon dioxide. Three binodal curves are formed, and of these two merge. The curves defining the areas in which mixtures separate into two layers are F—W—G (solid line), H—I—V—L and K—I—V—J. By way of illustration, a mixture of 49 per cent aniline, 11 per cent liquid carbon dioxide and 40 per cent oil, represented by the symbol M, is within the area of immiscibility, and separates into two layers. The composition of the extract phase, X, is about 78 per cent aniline, about 12 per cent carbon dioxide and about 10 per cent oil; the raffinate phase, Y, contains about 18 per cent aniline, about 10 per cent carbon dioxide and about 72 per cent oil. This is essentially an extraction of oil with aniline, with the raffinate Y of higher quality as a result of the selectivity of aniline. The solubility of oil in aniline is augmented greatly by the presence of carbon dioxide, thus permitting a much smaller volume of solvent (aniline) and a larger capacity for oil to be treated.

An extraction between V and I is essentially a liquid carbon dioxide extraction, the quality of the oil in V being better than in I. The cooperation between aniline and liquid carbon dioxide is evidenced by the greater solubility of the oil at V than at J, that is, without aniline.

With aniline, and other solvents of type B in combination with liquid carbon dioxide, the extract phase V separates into two additional layers when carbon dioxide is removed therefrom. Since the extract phase V is of higher quality, that is, more paraffinic than the original oil, its mutual miscibility with aniline, after reducing its carbon dioxide content, is less, requiring a larger curve, dotted line $e'$ $r'$. As shown in Figure 12, an extract-extract phase, $e'$, is obtained, together with an extract-raffinate phase, $r'$. The extract-extract phase contains an oil of intermediate quality; this is generally recycled with the aniline associated therewith or recycled alone following separation from aniline by distillation or other suitable procedure. The extract-raffinate phase contains about 10 per cent aniline and about 90 per cent of oil. The latter oil is of excellent quality and is withdrawn from the system.

Surprisingly, the raffinate phase, I, also separates into two additional layers when carbon dioxide is removed therefrom. A lower curve, $e''$ $r''$ defines this separation, since this oil is more naphthenic and is more miscible with aniline, with the raffinate-raffinate as $r''$. The raffinate-extract comprises about 92 per cent aniline and about 8 per cent oil, the oil being of poor quality. The latter is separated from aniline by distillation, by extraction with liquid carbon dioxide, or by washing with acid, etc., and is removed from the system. The raffinate-raffinate, $r''$, contains about 20 per cent aniline and about 80 per cent oil of intermediate quality. The latter oil is recycled, and need not be separated from the aniline admixed therewith.

Figures 13 through 32, inclusive, are ternary diagrams for systems similar to that shown in Figure 12, that is, wherein aniline is replaced with other solvents of type B. In Figures 13 through 32, inclusive, liquid carbon dioxide and the naphthenic oil, described above, are used with the following solvents, unless otherwise indicated:

Figure 13: tetrahydrofurfuryl alcohol, or o-anisidine
Figure 14: phenol
Figure 15: o-nitrobiphenyl
Figure 16: methyl phthalate
Figure 17: phenylacetonitrile
Figure 18: hydrocinnamaldehyde
Figure 19: o-nitrochlorobenzene
Figure 20: pinacol
Figure 21: phenylethanol
Figure 22: cinnamaldehyde
Figure 23: o-toluidine
Figure 24: o- or p-cresol, with n-hexadecane
Figure 25: β-hydroxyethyl acetate, with tetralin
Figure 26: β-hydroxyethyl acetate, with α-methylnaphthalene
Figure 27: tetrabromoethane, with n-tetradecane
Figure 28: triethylene glycol, with α-methylnaphthalene
Figure 29: N-methyl aniline, with crystal oil (a highly refined paraffin oil)
Figure 30: ethylene glycol, with n-decyl alcohol
Figure 31: o-chloroaniline, with n-hexadecane
Figure 32: m-cresol, with n-hexadecane Each system can be used for a double or multiple extraction of oil as in the examples described. Some of the solvents mentioned are solids at 25° C., namely, phenol, o-nitrobiphenyl, o-nitrochlorobenzene, pinacol, o- and p-cresol as indicated by a line across the solvent corner, but each of these solvents except phenol dissolves enough carbon dioxide to liquefy it at room temperature. Phenol is liquefied by the presence of both carbon dioxide and lubricating oil.

Figure 33:
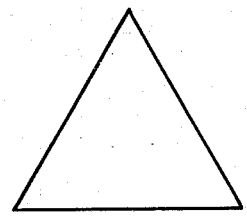

In contrast with the foregoing results obtained with liquid carbon dioxide in combination with a solvent of type A or B, results of a quite different character have been obtained with other well-known solvents in combination with liquid carbon dioxide. For example, Figure 33 shows the type of ternary diagram obtained with any mutually miscible pair of liquids, each of which is miscible with liquid carbon dioxide; typical of such a system is: liquid carbon dioxide-methyl alcohol-benzene. Innumerable systems of this character can be found. It is obvious that no extraction is possible with such a system.

Figure 34:
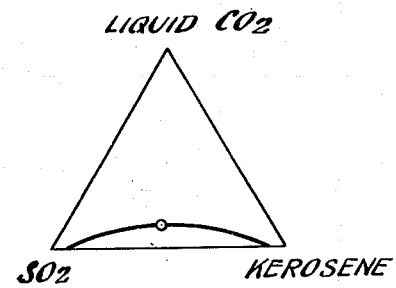
Figure 35:
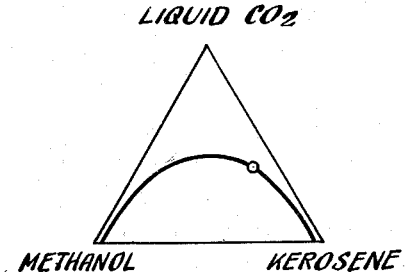
Figure 36:
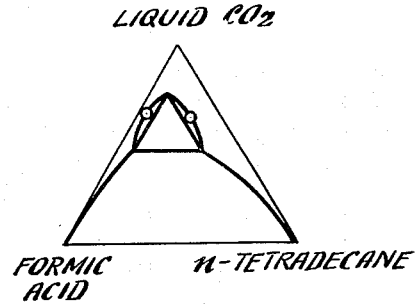
Figure 37:
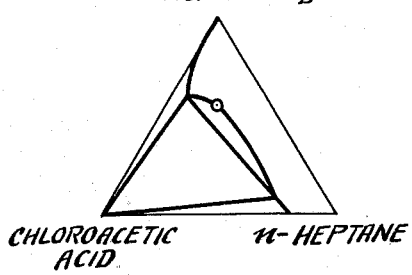

Figures 34 and 35 show systems in which liquid carbon dioxide is miscible with the solvent and the third component, a hydrocarbon, but the solvent and hydrocarbon are incompletely miscible with each other. The systems are: liquid carbon dioxide-sulfur dioxide-kerosene (boiling range, 150 to 300° C.), and liquid carbon dioxide-methanol-kerosene. Eleven such systems have been studied. A more complicated relationship is that obtained with liquid carbon dioxide-formic acid-n-tetradecane, wherein three liquid phases are formed; this is shown by Figure 36. The system represented in Figure 37 is further complicated by a solid phase and two liquid phases; this is liquid carbon dioxide-chloroacetic acid-n-heptane.

Figure 38:
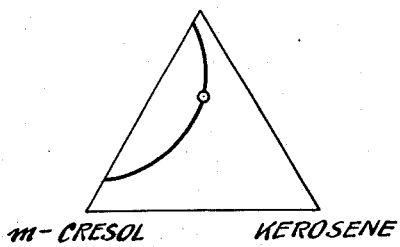

When liquid carbon dioxide and the solvent used are not miscible, but each is miscible with the hydrocarbon component, the ternary diagram is of the character shown by Figure 38. The system, liquid carbon dioxide-m-cresol-kerosene (B. R. 150 to 300° C.), is shown by Figure 38. More than fifty such systems have been studied; but, as will be apparent, these systems are unlike the systems coming within the present invention.

Figure 39:
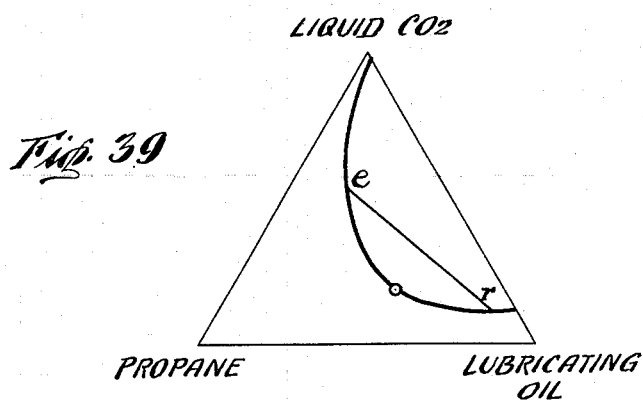
Figure 40:
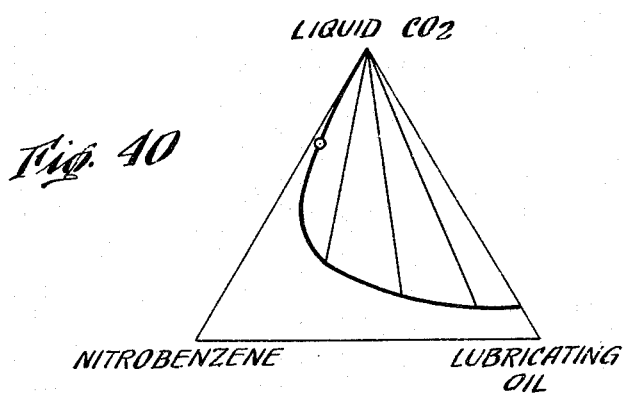
Figure 41:
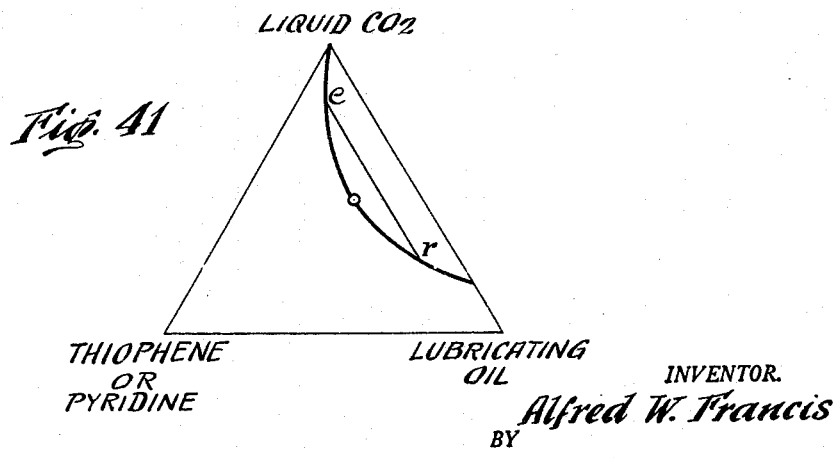

Systems in which the solvent serves as a diluent for the hydrocarbon component so as to increase the solvent power of liquid carbon dioxide for the hydrocarbon, are illustrated by Figures 39–41. In other words, these systems involve a solvent miscible with the hydrocarbon and with liquid carbon dioxide, but the hydrocarbon and liquid carbon dioxide are incompletely miscible. Figure 39 shows liquid carbon dioxide-propane-lubricating oil (same as in Figure 3); Figure 40, liquid carbon dioxide-nitrobenzene-lubricating oil (same as in Figure 3); Figure 41, liquid carbon dioxide-thiophene (also pyridine)-lubricating oil (same as in Figure 3). More than ninety such systems have been studied; however, they stand apart from the present invention.

Another type of system is that wherein liquid carbon dioxide is miscible with a hydrocarbon component, and wherein neither liquid carbon dioxide or the hydrocarbon is miscible with the solvent. Representative of this type of system is liquid carbon dioxide-phenol-n-heptane, shown by Figure 42. More than sixty such systems have been studied but, here again, they are not pertinent to the present process.

An unusual relationship is shown in Figure 43 by the system liquid carbon dioxide-formic acid-n-hexadecane, wherein three liquid phases are formed although two of the components are mutually miscible. The unusual feature is due probably to the unique property of formic acid in being miscible with anhydrous carbon dioxide, although practically immiscible with every hydrocarbon.

When the solvent and hydrocarbon are miscible, but neither mixes completely with liquid carbon dioxide, a ternary diagram of the type illustrated by Figure 44 is obtained. The system in the latter figure is liquid carbon dioxide-m-cresol-lubricating oil. More than fifty other systems of this class have been studied.

In the event that no pair of the three components is completely miscible, three binodal curves characterize the ternary diagram. These curves can be separate as illustrated by Figures 45, 46, 47 and eighteen other related systems which have been studied. Other combinations giving three separate curves are those of liquid carbon dioxide and decalin and either α-chloropropionic acid, aldol, β-chloroethanol, furfuryl alcohol or dipropylene glycol; those of liquid carbon dioxide and n-tetradecane with hydrocinnamaldehyde, p-chlorophenol, benzyl alcohol or m-cresol; those of liquid carbon dioxide and n-hexadecane with eugenol, benzal acetone, hydrocinnamaldehyde, o- or p-toluidine, tetrahydrofurfuryl alcohol, or o-nitrochlorobenzene; and liquid carbon dioxide and 1-octadecene with m-toluidine. Two of the three curves can be merged as in Figures 9–32, or as in Figure 48. The latter type is exemplified also by systems of liquid carbon dioxide and beta-hydroxyethyl acetate with decalin or n-tetradecane.

Finally, all three binodal curves can be merged, providing three layers of compositions represented by the corners of the inside triangles of Figures 49 and 50. This type includes also the systems of liquid carbon dioxide and lubricating oil with furfuryl alcohol or cinnamyl alcohol; those of liquid carbon dioxide and n-tetradecane with propylene glycol, triethylene glycol or ethylene glycol; liquid carbon dioxide-decalin-triethylene glycol; liquid carbon dioxide-transformer oil-aniline; liquid carbon dioxide-tetralin-triethylene glycol; liquid carbon dioxide and α-methylnaphthalene with formamide or diethylene glycol.

The data from which Figures 3–50 were prepared, were obtained with a visual autoclave, operating at room temperature, about 25° C. The autoclave is a Jerguson gauge of 116 parts by volume capacity, with thick narrow Pyrex glass windows front and back. Incandescent lamps are mounted behind the vertical position of the autoclave. Agitation of the materials is obtained by rotation of the autoclave, end-over-end, within a heat-insulated case. The latter is provided with strip heaters which permit heating by radiation, and with means for cooling to low temperature. The autoclave was charged with the liquid reagents, the carbon dioxide being introduced from a cylinder. Solubility of carbon dioxide in another liquid was estimated by charging a definite volume of that liquid and then adding carbon dioxide until after agitation a new liquid phase appeared (at the top). Then additional increments of liquid carbon dioxide were added. By extrapolation, the drop in equilibrium position of the interface could be used to estimate approximately the solubility of the other liquid carbon dioxide. If there was no separation into two liquid phases, the miscibility was considered to be complete only after about three volumes of carbon dioxide were added for one of the other liquids.

In all cases with unmerged binodal curves a small circle is shown. This is the plait point or critical solution point, that is, the point at which the compositions of two liquid phases approach each other so that the interface fades out as a critical point. The position of the plait point can be of considerable importance. For example, compare Figures 39, 40 and 41. In Figure 39 the plait point is low, and the tie lines are so oriented that the cosolvent propane is much more soluble in the carbon dioxide layer than in the oil layer. This favors a good yield of oil since $e$ is further from the left side, indicating a higher solubility than it would be otherwise. If propane were a polar compound, it would be unfavorable to quality of product because its selectivity would oppose that of carbon dioxide, but it is practically unselective and the selectivity of carbon dioxide controls.

In Figure 41 the plait point is in the middle and the tie lines are substantially parallel to the side line. The cosolvent, thiophene or pyridine, is divided almost equally between the two layers, and again the selectivity of carbon dioxide controls. The shallowness of the curve is favorable in providing a good yield with thiophene or pyridine, which are good homogenizers.

In Figure 40, the plait point is close to the left side and the orientation of the tie lines indicates that nitrobenzene dissolves in the oil in preference to liquid carbon dioxide. This results in a very low yield of oil dissolved in the carbon dioxide layer. However, this orientation is favorable to quality of oil in the carbon dioxide extract since the opposite selectivity of nitrobenzene cooperates with that of liquid carbon dioxide.

It has also been found that a number of solvents behave as homogenizers for oils and liquid carbon dioxide. In the order of their effectiveness i. e., the amount of solvent required to homogenize oil and carbon dioxide, they are: pyridine; cyclohexanone; benzonitrile; thioxane; $\alpha$-picoline; camphor; $\beta$-$\beta'$-dichloroisopropyl ether; ethylphenyl acetate; thiophene; methyl, n-hexyl ketone; tolunitriles; acetal; acetyl chloride; anisole; tertiary-butyl alcohol; n-butyl oxalate; crotonaldehyde; ethyl benzoate; ethyl chlorocarbonate; ethylene bromide; ethyl formate; mesityl oxide; paraldehyde; propionaldehyde; iso-propyl ether; valeraldehyde; benzene; n-butane; acrolein butyl Cellosolve butyraldehyde; chlorobenzene; chloroform; ethyl ether; ethyl salicylate; n-heptaldehyde; methyl benzoate; n-butyraldehyde; acetophenone; benzaldehyde; 2-butanone (methyl, ethyl ketone); n-butane; n-butyl ether; caproic acid; caprylic acid; carbon tetrachloride; dioxane; ethyl acetate; ethyl carbonate; methylal; phenyl isocyanate; phosphorus trichloride; salicylaldehyde; hydrogen sulfide; limonene; methyl acetate; o-chlorophenol; and methyl salicylate. All of the foregoing solvents are better homogenizers than propane. In operation, a relatively small amount, for example 17 per cent, of pyridine in the mixture or up to 34% of such homogenizers are used with liquid carbon dioxide.

I claim:

1. The process of separating a hydrocarbon mixture selected from the group consisting of hydrocarbon mixtures ranging from gas oils to lubricating oil stocks, into fractions at least one of which has a higher viscosity index than that of the original mixture, which comprises: contacting the mixture with liquid carbon dioxide and a solvent under sufficient pressure to maintain a carbon dioxide-rich phase in the liquid state, whereupon a raffinate phase and an extract phase are formed, said solvent being at least partially miscible with liquid carbon dioxide and with the original mixture, and does not form three phases with the mixture and liquid carbon dioxide; effecting phase separation of the raffinate and extract under said pressure; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate, thereby obtaining a hydrocarbon fraction of higher viscosity index than that of the original hydrocarbon mixture.

2. The process of separating a hydrocarbon mixture selected from the group consisting of hydrocarbon mixtures ranging from gas oils to lubricating oil stocks, into fractions at least one of which has a higher viscosity index than that of the original mixture, which comprises: contacting the mixture with liquid carbon dioxide and a solvent under sufficient pressure to maintain a carbon dioxide-rich phase in the liquid state, whereupon a raffinate phase and an extract phase are formed, said solvent being miscible with liquid carbon dioxide and incompletely miscible with the original mixture; effecting phase separation of the raffinate and extract under said pressure; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate, thereby obtaining a hydrocarbon fraction of higher viscosity index than that of the original hydrocarbon mixture.

3. The process of separating a lubricating oil into fractions at least one of which has a higher viscosity index than that of the original lubricating oil and at least one of which has a lower viscosity index than that of the original oil, which comprises: contacting the oil with liquid carbon dioxide and a solvent under sufficient pressure to maintain a carbon dioxide-rich phase in the liquid state, whereupon a raffinate phase and an extract phase are formed, said solvent being miscible with liquid carbon dioxide and incompletely miscible with the original oil; effecting phase separation of the raffinate and extract under said pressure; removing carbon dioxide and solvent from the raffinate phase, thereby obtaining an oil fraction of lower viscosity index than that of the original lubricating oil; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate, thereby obtaining an oil fraction of higher viscosity index than that of the original lubricating oil.

4. The continuous process of separating a lubricating oil into fractions at least one of which has a higher viscosity index than that of the original oil and at least one of which has a lower viscosity index than that of the original oil, which comprises: contacting the oil with liquid carbon dioxide and a solvent under sufficient pressure to maintain a carbon dioxide-rich phase in the liquid state, whereupon a raffinate phase and an extract phase are formed, said solvent being miscible with liquid carbon dioxide and incompletely miscible with the original oil; effecting phase separation of the raffinate and extract under said pressure; removing carbon dioxide and solvent from the raffinate phase, thereby obtaining an oil fraction of lower viscosity index than that of the original lubricating oil; recycling to said contacting operation liquid carbon dioxide and solvent recovered from said raffinate phase, and removing from the system said oil fraction of lower viscosity index; removing carbon dioxide from the extract phase; settling the extract phase substantially free of carbon dioxide, whereupon an extract-raffinate and an extract-extract are formed; effecting phase separation of the extract-raffinate and extract-extract; recycling to said contacting operation said extract-extract; removing solvent from the extract-raffinate, thereby obtaining an oil fraction of higher viscosity index than that of the original lubricating oil; recycling to said contacting operation said solvent recovered from the extract-raffinate; and removing from the system said oil of higher viscosity index.

5. The process as defined by claim 2 wherein the solvent is selected from the group consisting of: β,β¹-dichlorodiethyl ether, diethylene glycol monoethyl ether, isopropyl alcohol, B-ethoxyethanol, 1-nitropropane, diacetone alcohol, ethyl lactate, ethyl oxalate, ethyl succinate, ethyl acetoacetate, ethyl chloroacetate, and benzonitrile.

6. The process as defined by claim 2 wherein the solvent is β,β¹-dichlorodiethyl ether.

7. The process as defined by claim 4 wherein the solvent is selected from the group consisting of: β,β¹-dichlorodiethyl ether, diethylene glycol monoethyl ether, isopropyl alcohol, β-ethoxyethanol, 1-nitropropane, diacetone alcohol, ethyl lactate, ethyl oxalate, ethyl succinate, ethyl acetoacetate, ethyl chloroacetate, and benzonitrile.

8. The process of separating a lubricating oil into fractions of different properties, which comprises: contacting the oil with liquid carbon dioxide and a solvent under sufficient pressure to maintain a carbon dioxide-rich phase in the liquid state, whereupon a raffinate phase and an extract phase are formed, said solvent being miscible with liquid carbon dioxide and incompletely miscible with the original oil; effecting phase separation of the raffinate and extract under said pressure; removing carbon dioxide from the extract phase; settling the extract phase substantially free of carbon dioxide, whereupon an extract-raffinate and extract-extract are formed; effecting phase separation of the extract-raffinate and the extract-extract; removing solvent from the extract-raffinate and the extract-extract, thereby obtaining fractions differing in properties and having different properties than those of the original mixture.

9. The process of separating a hydrocarbon mixture selected from the group consisting of hydrocarbon mixtures ranging from gas oils to lubricating oil stocks, into fractions at least one of which has a higher viscosity index than that of the original mixture, which comprises: contacting the mixture with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and with the original mixture, and does not form three phases with the mixture and liquid carbon dioxide; effecting phase separation of the raffinate and extract under said pressure; removing carbon dioxide from the extract phase; settling the extract phase substantially free of carbon dioxide, whereupon an extract-raffinate and an extract-extract are formed; effecting phase separation of the extract-raffinate and extract-extract; removing solvent from the extract-raffinate, thereby obtaining a hydrocarbon fraction of higher viscosity index than that of the original hydrocarbon mixture.

10. The process of separating a lubricating oil into fractions at least one of which has a higher viscosity index than that of the original lubricating oil and at least one of which has a lower viscosity index than the original oil, which comprises: contacting the oil with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and the original mixture, and does not form three phases with the oil and liquid carbon dioxide; effecting phase separation of the raffinate and extract under said pressure; removing carbon dioxide from the raffinate phase; settling the raffinate phase substantially free of carbon dioxide, whereupon a raffinate-extract and a raffinate-raffinate are formed; effecting phase separation of the raffinate-extract and the raffinate-raffinate; removing solvent from the raffinate-extract, thereby obtaining an oil of lower viscosity index than that of the original lubricating oil; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate, thereby obtaining an oil fraction of higher viscosity index than that of the original lubricating oil.

11. The continuous process of separating a lubricating oil into fractions at least one of which has a higher viscosity index than that of the original oil and at least one of which has a lower viscosity index than that of the original oil, which comprises: contacting the oil with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and with the original oil, and does not form three phases with the oil and liquid carbon dioxide; effecting phase separation of said raffinate and extract under said pressure; removing carbon dioxide from the raffinate phase; settling the raffinate phase substantially free of carbon dioxide, whereupon a raffinate-extract and a raffinate-raffinate are formed; recycling to said contacting operation said raffinate-raffinate; removing solvent from the raffinate-extract, thereby obtaining an oil of lower viscosity index than that of the original lubricating oil; recycling to said contacting operation liquid carbon dioxide and solvent recovered from said raffinate-raffinate and raffinate-extract, respectively; removing from the system said oil fraction of lower viscosity index; removing carbon dioxide from the extract phase; settling the extract phase substantially free of carbon dioxide, whereupon an extract-raffinate and an extract-extract are formed; effecting phase separation of the extract-raffinate and the extract-extract; recycling to said contacting operation said extract-extract; removing solvent from the extract-raffinate, thereby obtaining an oil fraction of higher viscosity index than that of the original lubricating oil; recycling to said contacting operation said solvent recovered from the extract-raffinate; and removing from the system said oil of higher viscosity index.

12. The process as defined by claim 9 wherein the solvent is selected from the group consisting of: aniline, o-cresol, p-cresol, o-toluidine, methylaniline, o-chloroaniline, β-hydroxyethyl acetate, tetrahydrofurfuryl alcohol, phenylethanol, pinacol, phenol, phenylacetonitrile, hydrocinnamaldehyde, methyl phthalate, o-nitrochlorobenzene, triethylene glycol, o-nitrobiphenyl, o-anisidine, benzoic anhydride, cinnamaldehyde, benzyl alcohol, and ethyl phthalate.

13. The process as defined by claim 9 wherein the solvent is aniline.

14. The process as defined by claim 9 wherein the solvent is tetrahydrofurfuryl alcohol.

15. The process as defined by claim 11 wherein the solvent is selected from the group consisting of: aniline, o-cresol, p-cresol, o-toluidine, methylaniline, o-chloroaniline, tetrahydrofurfuryl alcohol, phenylethanol, pinacol, phenol, phenylacetonitrile, hydrocinnamaldehyde, methyl phthalate, o-nitrochlorbenzene, o-nitrobiphenyl, o-anisidine, benzoic anhydride, cinnamaldehyde, benzyl alcohol, and ethyl phthalate.

16. The process of separating a mixture of compounds selected from the group consisting of hydrocarbon mixtures ranging from gas oils to lubricating oil stocks, into fractions of different properties, which comprises: contacting the mixture with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and with the original mixture of compounds, and does not form three phases with the original mixture of compounds and liquid carbon dioxide; effecting phase separation of the raffinate and extract under said pressure; removing carbon dioxide from the raffinate phase; settling the raffinate phase substantially free from carbon dioxide, whereupon a raffinate-extract and a raffinate-raffinate are formed; removing solvent from the raffinate-raffinate and raffinate-extract, thereby obtaining fractions differing in properties and having different properties from those of the original mixture; removing carbon dioxide from the extract phase; settling the extract phase substantially free from carbon dioxide, whereupon an extract-raffinate and an extract-extract are formed; effecting phase separation of the extract-raffinate and the extract-extract; removing solvent from the extract-raffinate and the extract-extract, thereby obtaining fractions differing in properties and having different properties from those of the original mixture and the fractions recovered from the raffinate-raffinate and the raffinate-extract.

17. The process of separating a lubricating oil into fractions of different properties, which comprises: contacting the oil with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and with the original oil, and does not form three phases with the original oil and liquid carbon dioxide; effecting phase separation of the raffinate and extract phases under said pressure; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate and the extract-extract, thereby obtaining oil fractions differing in properties and having different properties than those of the original lubricating oil.

18. The process of separating a polycyclic hydrocarbon and a monocyclic hydrocarbon from a mixture containing the same, which comprises: contacting the mixture with liquid carbon dioxide and a solvent under sufficient pressure to maintain a carbon dioxide-rich phase in the liquid state, whereupon a raffinate phase and an extract phase are formed, said solvent being miscible with liquid carbon dioxide and incompletely miscible with the original mixture; effecting phase separation of the extract and raffinate under said pressure; removing carbon dioxide from the extract phase; settling the extract phase substantially free of carbon dioxide, whereupon an extract-raffinate and an extract-extract are formed; effecting phase separation of the extract-raffinate and the extract-extract; removing solvent from the extract-raffinate, thereby obtaining a fraction substantially richer in said monocyclic hydrocarbon than the original mixture; removing solvent and carbon dioxide from the raffinate phase, thereby obtaining a fraction substantially richer in said polycyclic hydrocarbon than the original mixture.

19. The process of separating a polycyclic hydrocarbon and a monocyclic hydrocarbon from a mixture containing the same, which comprises: contacting the mixture with liquid carbon dioxide and a solvent under sufficient pressure to maintain a carbon dioxide-rich phase in the liquid state, whereupon a raffinate phase and an extract phase are formed, said solvent being incompletely miscible with liquid carbon dioxide and with the original mixture, and does not form three phases with the original mixture and liquid carbon dioxide; effecting phase separation of the raffinate and extract under said pressure; removing carbon dioxide from the extract phase; settling the extract phase substantially free of carbon dioxide, whereupon an extract-raffinate and an extract-extract are formed; effecting phase separation of the extract-raffinate and extract-extract; removing solvent from the extract-raffinate, thereby obtaining a fraction substantially richer in said monocyclic hydrocarbon than said original mixture; removing carbon dioxide from the raffinate phase; settling the raffinate phase substantially free of carbon dioxide, whereupon a raffinate-extract and a raffinate-raffinate are formed; effecting phase separation of the raffinate-extract and the raffinate-raffinate; removing solvent from the raffinate-extract, thereby obtaining a fraction substantially richer in said polycyclic hydrocarbon than said original mixture.

ALFRED W. FRANCIS.

REFERENCES CITED

The following references are of record in the file of this patent:

UNITED STATES PATENTS

| Number | Name | Date |
|---|---|---|
| 2,034,495 | Sullivan, Jr. | Mar. 17, 1936 |
| 2,130,147 | Milmore | Sept. 13, 1938 |
| 2,188,051 | Lantz | Jan. 23, 1940 |
| 2,246,227 | Webb | June 17, 1941 |
| 2,346,639 | Andrews | Apr. 18, 1944 |

OTHER REFERENCES

Kalichevsky, Modern Methods of Refining Lubricating Oils, (1938).